(12) United States Patent
Soellner et al.

(10) Patent No.: US 11,577,950 B2
(45) Date of Patent: Feb. 14, 2023

(54) DEVICE FOR TREATING CONTAINERS

(71) Applicant: KRONES AG, Neutraubling (DE)

(72) Inventors: Juergen Soellner, Neutraubling (DE); Franz Braun, Neutraubling (DE); Holger Mueller, Neutraubling (DE); Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 157 days.

(21) Appl. No.: 16/935,062

(22) Filed: Jul. 21, 2020

(65) Prior Publication Data

US 2020/0346910 A1    Nov. 5, 2020

Related U.S. Application Data

(63) Continuation of application No. 15/579,919, filed as application No. PCT/EP2016/076192 on Oct. 31, 2016, now Pat. No. 10,759,643.

(30) Foreign Application Priority Data

Oct. 30, 2015    (DE) .................... 10 2015 118 619.5

(51) Int. Cl.
*B67C 3/00* (2006.01)
*B67C 7/00* (2006.01)
(Continued)

(52) U.S. Cl.
CPC ............ *B67C 3/001* (2013.01); *B65B 55/027* (2013.01); *B65G 47/519* (2013.01);
(Continued)

(58) Field of Classification Search
CPC .................... B67C 3/001; B67C 3/005; B67C 7/0073–0086; B67C 2007/006; B67C 2007/0066; B67C 2003/227; B67C 2003/228; B65B 2210/06; B65B 55/027; B65B 55/10; A61L 2/208; A61L 2202/23; A61L 2202/122
See application file for complete search history.

(56) References Cited

U.S. PATENT DOCUMENTS 3,016,666 A    1/1962    Whitmore
3,495,932 A    2/1970    Tuma
(Continued)

FOREIGN PATENT DOCUMENTS

DE    102008020121    10/2009
EP    0436042    7/1991
(Continued)

OTHER PUBLICATIONS

Office Action from Japanese patent application 2017-562996, dated Nov. 10, 2020, 8 pages.

*Primary Examiner* — Joshua G Kotis
(74) *Attorney, Agent, or Firm* — Haynes and Boone, LLP

(57) ABSTRACT

A device for treating containers, for example, for filling and closing containers in filling plants is described. The device includes an isolator chamber in which the treatment of the containers takes place, and an outlet disposed beneath the isolator chamber for discharging fluids, wherein the outlet has a housing for receiving ejected containers and a suction device for extracting gases from the isolator chamber.

18 Claims, 3 Drawing Sheets

(51) Int. Cl.
    *B65G 47/51*     (2006.01)
    *B65B 55/02*     (2006.01)
    *B67C 3/22*     (2006.01)
    *B67C 3/26*     (2006.01)

(52) U.S. Cl.
    CPC ........ *B67C 7/0073* (2013.01); *B65B 2210/06* (2013.01); *B67C 2003/227* (2013.01); *B67C 2003/228* (2013.01); *B67C 2003/2694* (2013.01); *B67C 2007/006* (2013.01); *B67C 2007/0066* (2013.01)

(56) References Cited

U.S. PATENT DOCUMENTS

| | | | |
|---|---|---|---|
| 4,208,852 | A | 6/1980 | Pioch |
| 4,296,068 | A | 10/1981 | Hoshino |
| 4,576,792 | A * | 3/1986 | Martensson ............. A61L 2/26 422/26 |
| 4,992,247 | A | 2/1991 | Foti |
| 5,368,815 | A | 11/1994 | Kasting, Jr. et al. |
| 5,439,643 | A | 8/1995 | Liebert |
| 5,730,163 | A | 3/1998 | Meyer et al. |
| 5,915,438 | A | 6/1999 | Winters et al. |
| 6,082,418 | A | 7/2000 | Naecker et al. |
| 6,315,902 | B1 | 11/2001 | Collasius et al. |
| 6,558,622 | B1 * | 5/2003 | Malchesky ............. A61B 90/70 134/30 |
| 6,596,232 | B1 | 7/2003 | Lin et al. |
| 6,652,199 | B2 | 11/2003 | Miyazaki et al. |
| 6,656,438 | B1 | 12/2003 | Kinoshita et al. |
| 7,014,813 | B1 | 3/2006 | Watling et al. |
| 7,523,596 | B2 | 4/2009 | Dovesi |
| 7,603,829 | B2 | 10/2009 | Brombin |
| 8,377,222 | B2 | 2/2013 | Lauzon |
| 8,844,585 | B2 | 9/2014 | Laumer et al. |
| 10,196,252 | B2 | 2/2019 | Hayakawa et al. |
| 10,759,643 | B2 * | 9/2020 | Soellner .................. B67C 3/001 |
| 2001/0033805 | A1 * | 10/2001 | Jacobs .................. A61B 90/70 422/62 |
| 2006/0008378 | A1 | 1/2006 | Imai et al. |
| 2006/0008383 | A1 | 1/2006 | Molleret et al. |
| 2008/0308177 | A1 | 12/2008 | Thuot et al. |
| 2009/0013645 | A1 | 1/2009 | Mastio et al. |
| 2010/0037984 | A1 | 2/2010 | Hiroya et al. |
| 2010/0043915 | A1 | 2/2010 | Sangi et al. |
| 2010/0196216 | A1 * | 8/2010 | Yokoi ..................... A61L 2/208 422/128 |
| 2010/0212699 | A1 * | 8/2010 | Theising ................. B08B 9/30 134/70 |
| 2010/0252142 | A1 | 10/2010 | Adriansens |
| 2010/0266467 | A1 | 10/2010 | Laumer et al. |
| 2011/0219728 | A1 * | 9/2011 | Humele ................. B29C 49/42 53/452 |
| 2011/0286899 | A1 | 11/2011 | Martini et al. |
| 2011/0302881 | A1 * | 12/2011 | Van Steen ............... B67C 3/008 53/558 |
| 2012/0018030 | A1 * | 1/2012 | Laumer ................... B67C 3/001 141/89 |
| 2012/0134881 | A1 * | 5/2012 | Hill ........................ A23L 3/001 422/111 |
| 2012/0317924 | A1 | 12/2012 | Gueguen |
| 2013/0071288 | A1 | 3/2013 | Huefner et al. |
| 2013/0233352 | A1 * | 9/2013 | Gattermeyer ............ B08B 3/00 134/18 |
| 2014/0231673 | A1 | 8/2014 | Yokobayashi et al. |
| 2014/0260099 | A1 | 9/2014 | Braum et al. |
| 2015/0090365 | A1 | 4/2015 | Clüsserath |
| 2017/0028449 | A1 | 2/2017 | Fernholz et al. |
| 2017/0341791 | A1 | 11/2017 | Weiler et al. |
| 2017/0348893 | A1 | 12/2017 | Ueda et al. |
| 2017/0360069 | A1 | 12/2017 | Concin et al. |

FOREIGN PATENT DOCUMENTS

| | | |
|---|---|---|
| EP | 2409948 | 1/2012 |
| JP | S64-037396 | 2/1989 |
| JP | H03-212330 | 9/1991 |
| JP | H09-058632 | 3/1997 |
| JP | 2000-095296 | 4/2000 |
| WO | WO-2009053190 A2 * | 4/2009 ............... B08B 9/00 |

* cited by examiner

DEVICE FOR TREATING CONTAINERS

CROSS REFERENCE TO RELATED APPLICATIONS

This application is a continuation of U.S. patent application Ser. No. 15/579,919 filed Dec. 5, 2017, which is a U.S. National Stage application under 35 U.S.C. § 371 of International Application No. PCT/EP2016/076192, filed Oct. 31, 2016, which claims priority from German Patent Application No. 10 2015 118 619.5 filed on Oct. 30, 2015, the contents of each of which are hereby incorporated by reference in their entirety.

BACKGROUND

Technical Field

The present invention relates to a device for treating containers, for example, for filling and closing containers in filling plants.

Related Art

Devices for treating containers, for example, for filling and closing containers in filling plants, are known from the state of the art. In the state of the art, containers, such as bottles or cans, are subject to a treatment, for example, filling and/or closing.

During the operation of such devices, it sometimes occurs that containers are not correctly filled, and need to be diverted from the path of the containers. This is particularly the case when cans are processed; incorrectly filled cans must be diverted before they reach the closing device, since can closers are unable to process empty or only slightly filled cans. In cleanroom fillers, however, in which the filling is carried out in an isolator chamber in a cleanroom atmosphere, in particular in the case of dry aseptic systems, the containers are not removed until after the isolator chamber. It is not possible to divert them in the isolator chamber because there is not enough space in the chamber for the containers that need to be diverted. This poses the risk, among others, that diverted containers will come into contact with moving parts of the filler and adversely affect the filling of other containers.

Nor is it possible to remove the containers from the isolator chamber during operation, since if a removal aperture in the isolator chamber were opened in order to eject a diverted container from the isolator chamber, as shown for example in DE 10 2008 020 121 A1, the positive pressure in the interior of the isolator chamber would be lost and the plant would become unsterile.

Furthermore, when containers are closed with a container lid, in particular when cans are closed, the lids are often treated with gas in order to reduce or remove the oxygen in the head space. In this case the underside of the lid is gassed, prior to the actual closing process, with a treatment gas, usually carbon dioxide (hereinafter referred to as $CO_2$). As a result of the gassing of the lid, the surroundings of the gas treatment device are enriched with the excess $CO_2$ that remains in the closer following the closing process. In order to avoid exceeding the maximum admissible workplace concentration (MAC) of the treatment gas in the area surrounding the closer, or in the production hall, a suction extractor is installed at the outlet of the closer, above the container path via which the containers are conveyed out of the closer after being closed. By means of the suction extractor, the $CO_2$ gas is sucked away and led out of the production hall.

Because $CO_2$ has a greater molar mass than oxygen and nitrogen, a portion of the $CO_2$ molecules sink downwards due to the effect of gravity, and form a pool of $CO_2$ on the table top of the enclosed closing device. The $CO_2$ escapes via drainage apertures of the table top, which are provided for the drainage of overspills of product, foam, water and cleaning medium, into the surroundings of the closer. Thus the suction extractor at the outlet of the closer cannot ensure that the MAC value for $CO_2$ is never exceeded. Furthermore, product aerosols can also be sucked in via the upwards suction, and can be deposited in the lines and the pump unit of the suction extractor, which can result over time in the formation of biofilms in the lines. The upwards suction extractor is, however, not included in the components of the device that are cleaned during a cleaning procedure, and it is thus not possible to prevent the formation of a biofilm in the suction extractor, and the associated contamination of the closing device.

A combination of the problems described above often occurs in such devices, wherein improvement of the device to counteract one of the problems brings about a worsening of the other current problems.

SUMMARY

An improved device for treating containers, which in particular enables improved workplace safety, is described.

A device for treating containers is described that includes an isolator chamber, in which the treatment of the containers takes place, and at least one outlet connected with the floor of the isolator chamber for discharging fluids. A suction device for extracting gases from the isolator chamber is connected with the at least one outlet.

Due to the provision of the isolator chamber, in which the treatment of the containers by at least one treatment unit takes place, a hygiene level that is defined in contrast to the surroundings, i.e. increased, can be created, and the hygiene requirements of the applicable plant can be met. Within the isolator, a cleanroom is generally provided, in particular a sterile environment and in several embodiments, an aseptic environment. The device can be designed for example as an aseptic device, and in the isolator chamber a defined cleanroom atmosphere can be provided in a known manner. The isolator chamber can, however, also be designed to meet a less exacting hygiene standard.

By means of the outlet on the underside of the isolator chamber, fluids can be discharged from the isolator chamber by the effect of gravity, without the atmosphere within the isolator chamber being contaminated by germs from outside the isolator chamber. In particular during a cleaning of the interior of the isolator chamber, the cleaning medium that is used for the cleaning can be discharged through the outlet.

Due to the fact that a suction device for extracting gases from the isolator chamber is connected with the outlet, the manufacturing costs of the device can be reduced by comparison with conventional devices, since no separate unit is needed for connecting the suction device with the isolator chamber. In particular, during the operation of the device, the suction device can extract via the outlet a gaseous treatment medium that is used for the treatment of the containers. This arrangement is particularly advantageous when $CO_2$ is used as the treatment medium. Due to its molecular mass, $CO_2$ accumulates on the floor of the isolator chamber, and can thus be particularly efficiently extracted via the outlet disposed in the floor of the isolator chamber by means of the suction device connected with the outlet.

Furthermore, by means of the common use of the outlet for removing not only fluids, in particular cleaning media, but also treatment gases such as in particular $CO_2$, an efficient and hygienically advantageous design of the device is achieved, since it is possible to dispense with additional apertures for extracting by suction the treatment gas, in particular $CO_2$, or treatment gases.

The floor of the isolator chamber is, in various embodiments, designed such that fluids within the isolator chamber, in particular fluid cleaning media, can be discharged by the effect of gravity into the outlet during the cleaning of the device. For this purpose, the outlet can be disposed at the deepest point of the housing floor. The floor of the isolator chamber is thus typically inclined in a funnel shape towards the outlet.

In some embodiments, a device for treating cleaning medium, for example a cleaning-in-place (CIP) system, is disposed downstream of the outlet. By this means the cleaning medium that is used for the cleaning can be treated, and water consumption can thereby be minimized. It can be particularly advantageous if the outlet and the device for treating cleaning medium are suitable for the CIP method. By this means it is possible to carry out the cleaning of components disposed within the isolator chamber without their disassembly, and by circulation of the cleaning medium and/or sterilization medium.

If the outlet has an outlet valve downstream of the connection of the suction device, for closing the outlet during the intervals between cleaning of the device, it can be ensured that no germs penetrate into the sterile area of the outlet and the isolator chamber during operation. By this means, particularly long treatment cycles can be achieved before renewed cleaning and/or sterilization is necessary for the interior of the isolator chamber and the at least one treatment unit that is disposed within. In addition, by means of the closing of the outlet valve, the level of the cleaning medium in the isolator chamber can be adjusted, so that cleaning medium that is accumulated by this means can act at least on relevant components, or can act on the entire treatment unit. Advantageously, the suction device is also cleaned in this manner, at least in part, since it is at least in part disposed below the isolator chamber or the level of the cleaning medium.

An outlet valve for establishing or blocking communication between the outlet and the suction device is generally disposed between the suction device and the outlet. By closing the outlet valve, the suction device can be decoupled from the outlet, so that, for example, while the device is being cleaned no cleaning medium can enter the suction device, or at least the components of the suction device that are disposed downstream of the outlet valve.

For the specific discharge of fluids, in particular treatment fluids and cleaning media, by the effect of gravity, a suction line of the suction device can have a gradient in the direction of the connection to the outlet.

In some embodiments, a moisture separator for separating moisture at the suction device is disposed on the outlet, for example, adjacent to a connection of a suction line of the suction device. By means of this, any aerosols or fluid particles that are present in the gases that are sucked out by the suction device can be separated, so that moisture-sensitive components of the suction device remain dry. By this means it can be also be avoided that, due to moisture, a biofilm forms in the suction device downstream of the moisture separator, and contaminates the atmosphere in the isolator chamber.

For efficient extraction by suction of gases from the isolator chamber, the suction device can have an extraction fan. The extraction fan is typically provided with a valve, so that when the extraction fan is not in motion its outlet aperture can be closed.

In several embodiments, the outlet has a pump for pumping out cleaning medium. By this means the fluid that is to be discharged can be particularly effectively discharged and/or conveyed to components disposed behind.

In one embodiment, a closer with lid gassing for closing the containers is disposed in the isolator chamber. Because of the closer's location in the isolator chamber, and its design in the form of an isolator, the drainage of the closer can take place via the outlet of the isolator chamber. In addition, the treatment gas, for example, $CO_2$, that is used for the lid gassing, can be extracted in a controlled manner by suction via the outlet and the suction device, and does not enter the environment external to the device. A filler is typically also disposed in the isolator chamber. The filled containers can thereby be transferred directly to the closer. In addition, only a single outlet is provided for both the filler and the closer, via which the treatment gas from the closer can also be extracted by means of the suction device.

In certain embodiments, the isolator chamber is divided into at least two treatment isolator chambers or isolator chamber segments, wherein for example, each of the treatment isolator chambers or isolator chamber segments is connected with the outlet via a connecting line. A treatment device is generally disposed in one treatment isolator chamber. By this means an individual treatment step, or its treatment device, can be separated from a further treatment step, and the sterility in the individual treatment isolator chambers, and thus of the device as a whole, can thereby be increased.

In this case it is also possible for the suction line to be in contact with only one of the connecting lines, in order to achieve the extraction of gases by suction from only one chamber among the treatment isolator chambers or isolator chamber segments. Depending on the designs of the devices for treating the containers, extraction of gases may be necessary in only one of the chambers. If lid gassing takes place in a closer, it may for example be necessary to provide suction extraction only in the chamber which includes the closer, and not in the other chambers.

In an alternative embodiment, it is also possible to provide at least two separate isolator chambers, which are connected with each other via a transport channel. By means of such an arrangement it can be ensured that any excess $CO_2$ cannot pass from one isolator chamber to the other.

In addition, a device for treating containers is described that includes an isolator chamber in which the treatment of the containers takes place, and an outlet connected with the floor of the isolator chamber for discharging fluids. The outlet has a housing for receiving ejected containers. The housing includes at least one inlet aperture disposed on the upper face of the housing which communicates with the isolator chamber, an outlet aperture disposed in the lower area of the housing for discharging fluid, a container guide disposed in the housing at least between the inlet aperture and the outlet aperture, and a removal aperture which can be closed.

Due to the fact that the outlet has a housing for receiving ejected containers, wherein the housing has at least one inlet aperture disposed on the upper face of the housing which communicates with the isolator chamber, and includes an outlet aperture disposed in the lower area of the housing for discharging fluid, a container guide disposed in the housing at least between the inlet aperture and the outlet aperture, and a removal aperture which can be closed, ejected containers can be collected in the housing, so that opening the system can be avoided, which thereby avoids an associated contamination of the cleanroom atmosphere within the isolator chamber and/or an associated loss of the positive pressure in the isolator chamber. Accordingly, the operating time of the device between two cleaning cycles can be extended, resulting in increased productivity for the device as compared with the prior art. The housing can thus be used as a collecting receptacle for collecting ejected containers.

The floor of the isolator chamber is generally designed such that fluids inside the isolator chamber, in particular fluid cleaning media, can be discharged by the effect of gravity into the outlet during the cleaning of the device. For this purpose, the outlet can be disposed at the deepest point of the housing floor. The floor of the isolator chamber is thus typically inclined in a funnel shape towards the outlet.

In addition, the isolator chamber itself can have a particularly small design, since no space needs to be provided within for storing ejected containers. Thus the isolator chamber can be designed to approach closely the contours of the at least one treatment unit that is disposed in the isolator chamber.

In this case the suction device can issue both into the outlet downstream of the outlet aperture of the housing and directly into the housing.

In an isolator chamber that is divided into a plurality of treatment isolator chambers or isolator chamber segments, or if a plurality of individual isolator chambers are provided, the outlet can also have more than one housing. The outlet, in one or more embodiments, has a housing for a majority of, or each of, the treatment isolator chambers.

In one embodiment, the housing is integrated with the isolator chamber. By this means the isolator chamber can have a particularly compact and simple design, and is additionally easy to clean.

Alternatively, the housing can be designed to be exchangeable, wherein the housing is generally connected with the isolator chamber via an airlock. By this means, when a housing is almost completely full of containers, it can be exchanged, after the airlock is closed, for another container which is not full, without contaminating the atmosphere within the isolator chamber.

It can be particularly advantageous if the container guide is designed as a perforated metal plate, or in the form of a plurality of rods. By this means the ejected containers are reliably guided in the direction of the removal aperture. Additionally, the container guide is easy to clean, since fluid that enters the housing can be discharged due to the open portions of the container guide. There is also almost no hindrance to the extraction by suction of gases that need to be extracted.

In several embodiments, the container guide has an incline in the direction of the removal aperture. By this means, when containers that fall through the inlet aperture meet the container guide, they are guided under their own weight in the direction of the removal aperture by the effect of gravity.

The inlet aperture on the upper face is typically disposed on a first side of the housing, and the removal aperture is on a side of the housing that is opposite the first side. By this means a large collecting area can be provided for ejected containers. Furthermore, by this means the containers are guided away from the area beneath the inlet aperture, so that blocking of the inlet aperture is avoided as long as the collecting area is not completely full. By means of this arrangement, it is also possible to remove containers on what could be referred to as the "operator's side" of the plant, while the actual ejection of containers can take place on the opposite side.

Particularly effective discharge of fluids can be achieved if a floor of the housing has an incline in the direction of the outlet aperture. Fluids to be discharged thereby flow automatically to the outlet aperture by the effect of gravity.

Generally, the incline of the container guide and the incline of the floor are formed in opposite directions from each other, wherein the removal aperture and the outlet aperture are typically disposed on opposite sides of the housing.

In various embodiments, the inlet aperture has an inlet closing device for interrupting, at least temporarily, the communication with the isolator chamber. By this means the interior of the isolator chamber can be closed off from the interior of the housing, for example because the housing is completely full of ejected containers, so that the atmosphere within the isolator chamber is not impaired when the removal aperture is opened, in particular because an exchange of gas between the surroundings and the isolator chamber can be prevented by this means. This also prevents germs or other contamination from entering the isolator chamber, so that when the housing is opened it is possible to avoid breaching the sterile environment in the isolator chamber.

Alternatively, the inlet closing device can close only part of the cross-section of the inlet aperture, which it thereby merely reduces, so that when the removal aperture is opened a flow of gas that is reduced by comparison with a fully open inlet aperture enters through the inlet aperture, due to the positive pressure in the isolator chamber by comparison with the surroundings of the device. By this means it is possible to maintain for a longer period the positive pressure in the isolator chamber, and thereby the, in some embodiments, sterile cleanroom atmosphere within the isolator chamber. At the same time, there is a constant flow of air through the remaining opening in the inlet aperture from the isolator chamber, which is charged with a positive pressure, in the direction of the removal aperture, so that no air can penetrate from the surroundings into the housing. Accordingly, during and/or following a removal of the ejected containers, the sterility of the atmosphere within the isolator chamber can, at least for the most part, be maintained. Thus it is not necessary to interrupt the operation of the device for cleaning purposes after a removal of the ejected containers, or at least no renewed sterilization of the plant needs to be carried out after the opening.

Furthermore, a device for treating containers, for example, for filling and closing containers in filling plants, is described that includes an isolator chamber in which the treatment of the containers takes place, and an outlet connected with the floor of the isolator chamber for discharging fluids. The outlet has a housing in accordance with one of the above-mentioned embodiments, and a suction device in accordance with one of the above-mentioned embodiments.

Because a suction device is provided on the outlet, the production costs of the device can be reduced by comparison with conventional devices, since the suction device needs no connecting unit of its own for connecting with the isolator chamber. In particular, during the operation of the device the suction device can extract a gaseous treatment medium that is used for the treatment of the containers. This arrangement is particularly advantageous when $CO_2$ is used as the treatment medium. Because the $CO_2$ has a greater molecular mass than, for example, oxygen and nitrogen, the gas collects on the floor of the isolator chamber, and can thus be particularly efficiently extracted by suction, without contamination of the interior of the isolator chamber, via the outlet disposed on the underside of the isolator chamber, by means of the suction device which is in communication with the outlet.

By means of the provision of the housing, ejected containers can be collected in the housing, so that it is possible to avoid a separate removal aperture with an associated contamination of the cleanroom atmosphere within the isolator chamber, and/or an associated loss of the positive pressure in the isolator chamber. Accordingly, the device can be operated for longer periods between cleaning cycles, which results in increased productivity of the device by comparison with the prior art. The housing can thus serve as a collecting receptacle for collecting ejected containers.

Furthermore, only one aperture in the isolator chamber is necessary for the extraction by suction of gaseous treatment media and for the discharge of fluids, for example sterilization fluid, cleaning medium and/or the filling fluid with which the containers are to be filled. Because of this, the device can be easily assembled and is easy to clean.

In addition, after the opening of the container removal aperture, the housing can thereby still be a so-called "gray room", since due to the suction a constant flow of gas and/or flow of air is created, out of the isolator chamber, through the housing, into the outlet aperture and to the suction device, and thus no germs can penetrate into the interior of the isolator chamber. Accordingly, an operating cycle of the device can again be extended, which again leads to an increase in the productivity of the device.

In one embodiment, a filler for filling the containers and a closer with lid gassing for closing the filled containers are disposed within the isolator. It is thereby possible, firstly, for the incorrectly filled and ejected containers to be collected in the housing, Secondly, the treatment gas used for lid gassing, for example $CO_2$, can be extracted by means of the suction device. This results in a particularly simple design of the device, since only one outlet and one suction extractor need to be provided. In addition, it is possible to prevent the treatment gas from contaminating the environment in which the device is located, for example a production hall, or accumulating in the environs of the device and causing the maximum admissible workplace concentration to be exceeded.

A particularly efficient and cost-effective design can be achieved if the filler and the closer are disposed together in the isolator chamber.

In an alternative embodiment, the isolator chamber is divided into a filler chamber for accommodating the filler and a closer chamber for accommodating the closer. The closer chamber and the filler chamber typically each have a separate suction line to the outlet. By this means the atmosphere in the filler chamber and the atmosphere in the closer chamber are substantially or entirely independent of each other.

Alternatively, the closer chamber can also be connected with the filler chamber, so that only one connection needs to be provided.

In one embodiment, a preform blowing device for stretch blow molding plastic preforms is provided upstream of the filler on the container path. In this case the floor of the isolator chamber is generally formed such that faulty or incorrectly treated preforms—prior to and following the stretch blow molding—can also enter the housing through the inlet aperture. By this means the above-mentioned advantages can be extended to the area of the preform blowing device.

Downstream of a device consisting of a preform blowing device and/or filler and/or closer, a device for marking the containers, for example with labels, or printing devices, can be disposed. After closing, the containers are typically dried by a device before they reach the device for marking them. The device for marking can be constructed in a single block with the device, or these can be provided in neighboring blocks.

In several embodiments, more than one housing is provided, wherein the outlet is connected with the outlet aperture of more than one, and typically every housing. By this means, if there is a plurality of treatment units within the isolator chamber, it is possible to provide a housing whose size and hence capacity is adapted to each treatment unit. In particular, an individual housing for receiving ejected containers can be provided for each of the filler, the closer and the preform blowing device. Alternatively, a separate hosing can be provided for individual treatment units only, wherein the remaining treatment units share another housing.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs, and in order to avoid redundancy repeated description of these elements is in part dispensed with.

Figure 1:
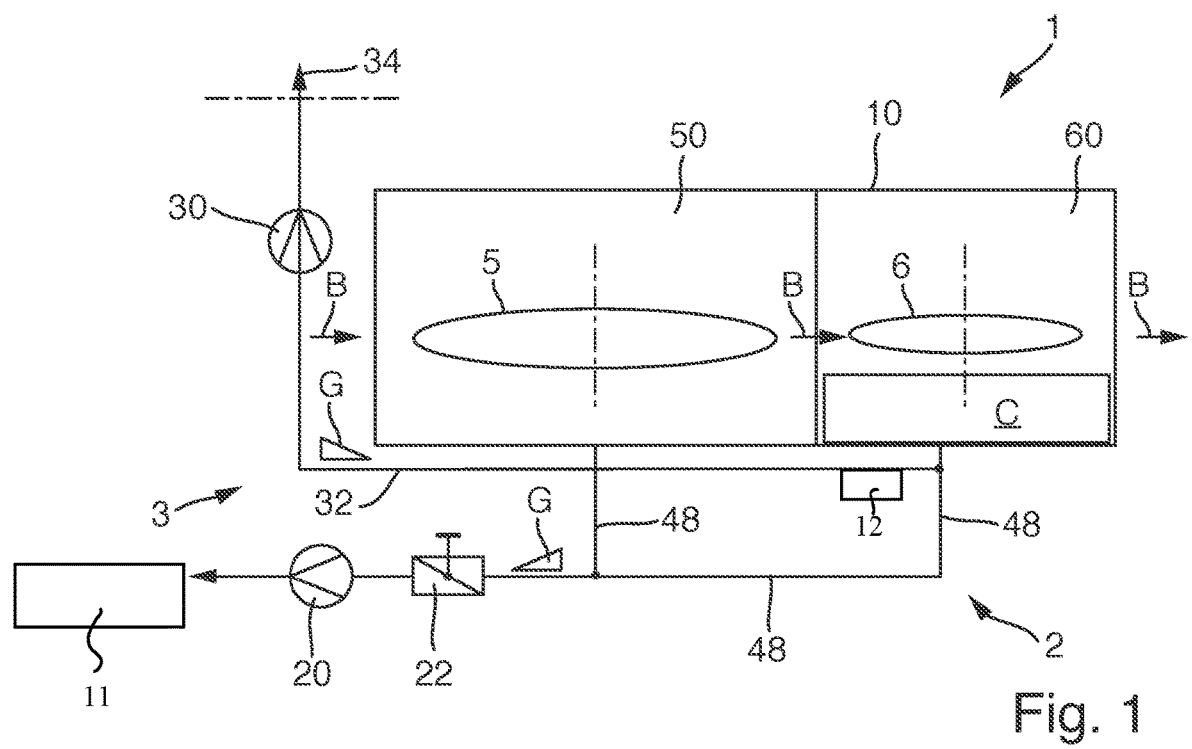
FIG. 1 is a schematic side elevation of a device for filling and closing containers, with an outlet which has a suction device.

FIG. 1 shows schematically a side elevation of a device 1 for filling and closing containers, with an outlet 2 which has a suction device 3. In the present case, the filling and closing of, for example, cans takes place in the device 1. The device 1 has an isolator chamber 10, which provides a space sealed off from the surroundings.

The device 1 can be designed, for example, as an aseptic device, and a defined cleanroom atmosphere can be provided in a known manner in the isolator chamber 10. The isolator chamber 10 can however also be designed to meet a less exacting standard of hygiene.

In this embodiment, the isolator chamber 10 is divided into a filler chamber 50 and a closer chamber 60, which are connected with each other via a connecting airlock. In an alternative embodiment, it is also possible to provide two separate isolator chambers, which are connected with each other via a transport channel.

A filler 5 for filling containers is disposed in the filler chamber 50. In the closer chamber 60, a closer 6 with lid gassing is provided for closing the containers that have been filled in the filler 5. $CO_2$ is used as the treatment gas for lid gassing. However, other treatment gases, for example nitrogen, can also be used.

Accordingly, not only the filler 5 but also the closer 6 is accommodated in an isolator chamber 10.

An outlet 2 is disposed beneath the isolator chamber 10. The outlet 2 has connecting lines 48 which open into the floor areas of both the filler chamber 50 and the closer chamber 60, and are thereby in communication with the interior of the isolator chamber 10. By this means, fluids that reach the floor of the isolator chamber 10 are discharged through the outlet 2 and the connecting lines 48 by the effect of gravity. The floor of each isolator chamber 10 is typically formed such that the separate floor areas are inclined in a funnel shape towards the outlet, and in particular towards the mouth of the connecting line 48, so that all fluids flow into the outlet 2.

The outlet 2 is also in communication with a suction device 3 for extracting gases from the isolator chamber 10. For this purpose, the connecting lines 48 are connected with a suction line 32. A moisture separator 12 for separating moisture at the suction device 3 is disposed on the outlet 2, for example, adjacent to a connection of the suction line 32 of the suction device 3. The gases are sucked by means of an extraction fan 30 into the suction device 3, and discharged via an exhaust air device 34 into an external atmosphere outside a production hall in which the device 1 is installed. The suction line 32 can also be in communication with only one of the connecting lines 48, in order to achieve the extraction by suction of gases from only one chamber of the isolator chamber 10. Depending on the design of the devices for treating the containers, extraction of gases may be necessary in only one of the chambers. If lids are treated with gas in a closer, it may for example only be necessary to provide suction extraction for the chamber that includes the closer, and not the other chamber.

The lines of the outlet 2 and the lines of the suction device 3 are both constructed with a gradient G, so that fluids which enter either of the lines are conveyed away under their own weight, due to the effect of gravity, and do not remain in the lines. The gradient is indicated in FIG. 1 by right-angled triangles designated with the letter G. The direction of the gradient G is shown in FIG. 1 by the inclination of the hypotenuse of each right-angled triangle.

A device for treating cleaning medium 11 is disposed downstream of the outlet 2, and the cleaning medium that is extracted via the outlet is transported by means of a pump 20 to this device 11. Here, the cleaning medium that was used for cleaning the device 1, and was extracted by means of the outlet 2, is treated. Thus there is a closed cycle of cleaning medium in the cleaning of the device 1, and by this means it is possible to save water and cleaning medium. Such a cleaning device 11 is in itself known.

In order to enable the outlet 2 to be closed in the intervals between cleaning procedures, and thus prevent contamination of the atmosphere within the isolator chamber 10 by germs originating from the outlet 2, the outlet 2 can be closed by an outlet valve 22.

The outlet valve 22 can also be used during a cleaning of the device 1 to prevent the outflow of the cleaning medium that is introduced into the device 1, so that the cleaning medium accumulates up to a specified level in the isolator chamber 10. In this manner the cleaning medium can also reach portions of the suction line 32 that are above its point of connection with the connecting lines 48, and the suction device 3 can thereby by flooded with the cleaning medium, at least partially and/or to the extent necessary, in order to clean it. Furthermore, a specified exposure time can be achieved for the components of the device that are below the level of the cleaning medium. After the outlet valve 22 is reopened, the accumulated cleaning medium can again be discharged and/or treated.

During the operation of the device 1, the containers that are to be filled are conveyed through the device along the container path B. The containers to be filled pass through the entry airlock into the filler chamber 50, in which they are filled with a filling product and conveyed onwards through the connecting airlock into the closer chamber 60 and to the closer 6. The closer 6 closes the filled containers, wherein a gassing with $CO_2$ takes place in order to rinse the container lids. After closing, the closed containers are conveyed along the container path B out of the device, through an exit airlock of the isolator chamber 10.

Because of the molecular mass of $CO_2$, the $CO_2$ accumulates on the floor of the closer chamber 60 due to the effect of gravity during the operation of the closer 6, and forms a pool of $CO_2$ on the floor. Because the outlet 2 is not impinged with cleaning medium during filling operation of the device 1, the suction device 3 can extract, via the outlet 2, the $CO_2$ that accumulates in the floor area of the closer. Because the outlet 2 is disposed beneath the isolator chamber 10, and the suction device 3 is formed as part of the outlet 2, particularly effective discharge of the $CO_2$ molecules is achieved.

Furthermore, by means of the common use of the outlet 2 for removing not only fluids, in particular cleaning media, but also $CO_2$, an efficient and hygienically advantageous design of the device 1 is achieved, since it is possible to dispense with additional apertures for extracting the $CO_2$ by suction.

Figure 2:
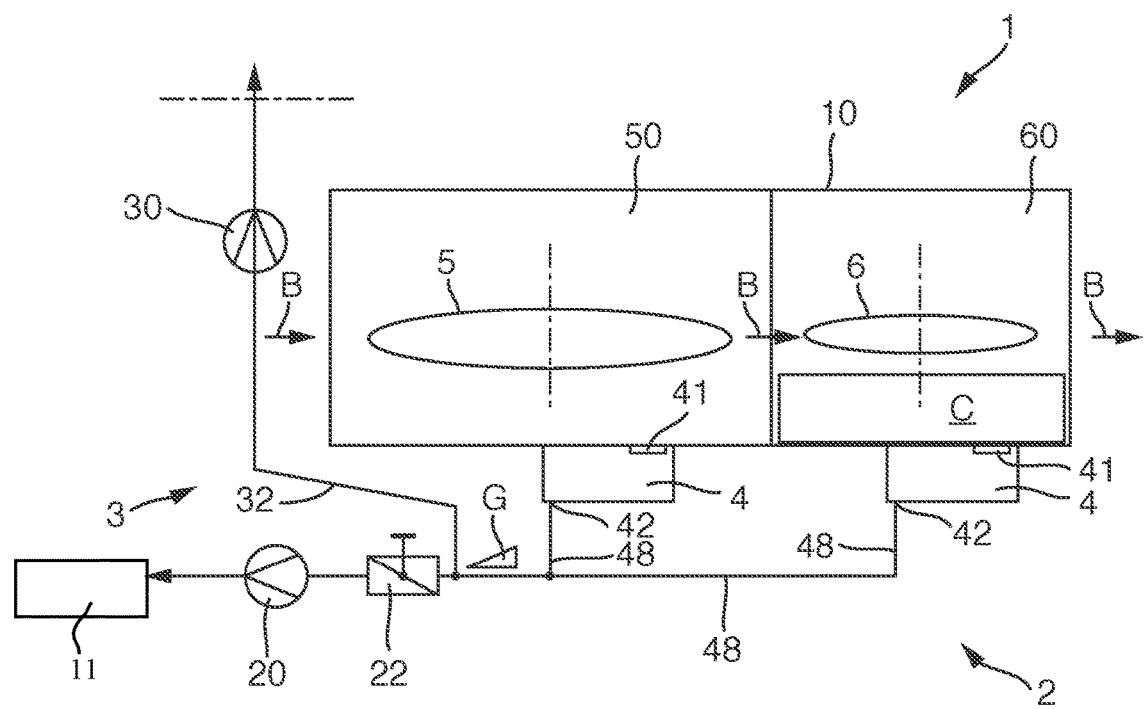
FIG. 2 is a schematic side elevation of a device for filling and closing containers, with an outlet which has a suction device and two housings for receiving ejected containers.

FIG. 2 shows a schematic side elevation of a further device 1 for filling and closing containers.

The design and operation, together with the cleaning procedure, of the device 1 correspond to those of the device in FIG. 1. Thus the device 1 in FIG. 2 also has an isolator chamber 10 divided into a filler chamber 50 and a closer chamber 60. In the filler chamber 50, a filler 5 for filling containers is disposed, and in the closer chamber 60 a closer 6 with lid gassing for the subsequent closing of the filled containers is disposed. Beneath the isolator 10 is again disposed an outlet 2 for discharging fluids, on which is again disposed a suction device 3 corresponding to that of FIG. 1, along with an outlet valve 22 and a pump 20 for conveying the extracted cleaning medium to a device for treating the cleaning medium.

In this example embodiment, however, the outlet 2 includes two housings 4 for receiving ejected containers.

In contrast to the device 1 from FIG. 1, the undersides of the filler chamber 50 and the closer chamber 60 of the device 1 in FIG. 2 each issue into a housing 4 for receiving ejected containers, which in turn issues in each case via an outlet aperture 42 into a connecting line 48 of the outlet 2. For communication with the isolator chamber 10, each housing 4 has an inlet aperture 41. The housings 4 are thereby connected with the isolator chamber 10 in a gas-tight manner. The housings 4 accordingly form part of the outlet 2.

During operation of the device 1, containers that are incorrectly filled in the filler 5 are ejected by an ejection device into the housing 4 that is beneath the filler chamber 50. The ejected containers thereby pass through the inlet aperture 41 into the housing 4, and are collected within. The housing 4 thus also serves as a collecting receptacle for ejected containers.

In a similar manner, faulty containers, for example incorrectly closed containers, are ejected from the closer 6, by means of a further ejection device disposed on the closer, into the housing 4 that is beneath the closer chamber 60. The ejected containers thereby pass through the inlet aperture 41 into the housing 4, and are collected within.

The housings 4 are generally designed to collect a plurality of containers. In addition, the sizes of the housings 4 can be adapted, such that if, for example, during the operation of the device 1, more containers are generally ejected during the filling part of an operating cycle than during the closing of the filled containers, the housing 4 beneath the filler 5 is designed to be larger, and therefore has a greater capacity for accommodating containers, than the housing 4 beneath the closer 6.

Because the housings 4 are connected with the suction device 3 via the outlet 2, gases in the isolator chamber 10, in particular the treatment gas $CO_2$ that accumulates in the closer chamber 60 as the pool C of $CO_2$, can be sucked out during the operation of the device 1 and discharged into the external atmosphere. This has already been described in connection with FIG. 1.

FIG. 2 shows two housings 4. In a device 1 in which only a single ejection device is provided to eject faulty containers, it is of course also possible to provide only a single housing 4—for example beneath the closer 6.

Figure 3:
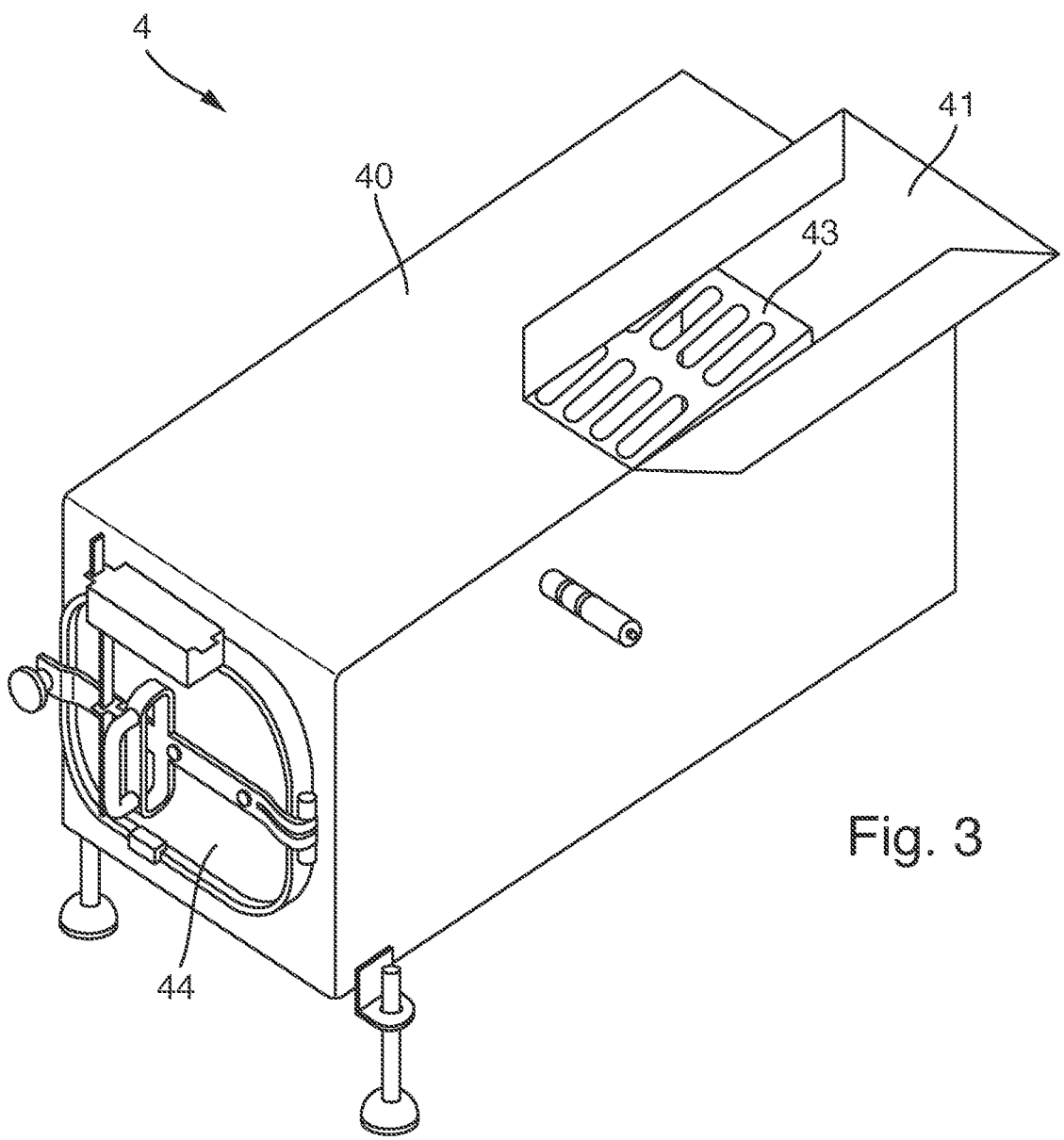
FIG. 3 is a schematic perspective side elevation of a housing for receiving ejected containers according to FIG. 2.

FIG. 3 shows schematically a perspective side elevation of a housing 4 for receiving ejected containers according to FIG. 2. On the upper face 40 of the housing 4 is disposed the inlet aperture 41, by means of which the housing 4 communicates with the isolator chamber. Through the inlet aperture 41, discharged fluids, gases extracted by suction, and ejected containers enter the interior of the housing 4, inside which a container guide 43 in the form of a perforated metal plate is disposed. The container guide 43 has the task of guiding ejected containers in the direction of a removal aperture 44. The removal aperture 44 is shown here in an airtightly closed state. To remove the containers that have collected in the housing 4, the removal aperture 44 can be temporarily opened.

Figure 4:
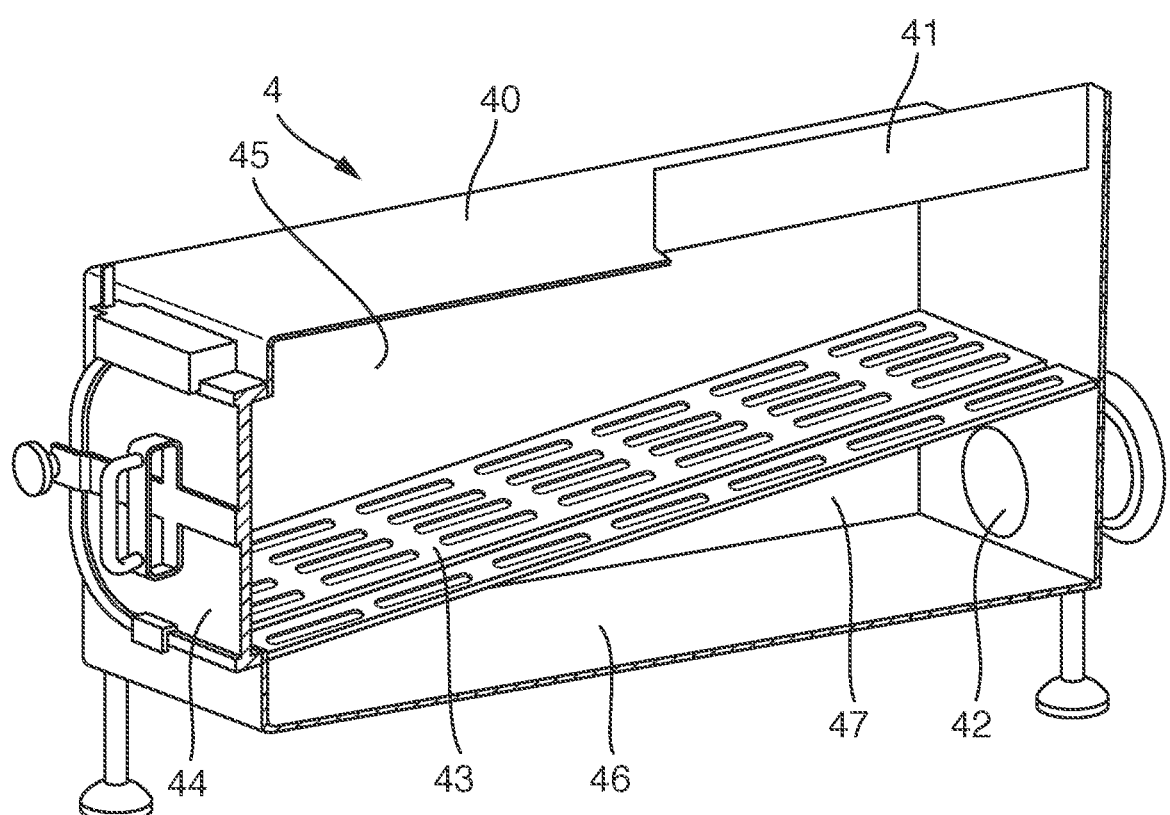
FIG. 4 is a schematic perspective partially sectional view through the housing from FIG. 3.

FIG. 4 shows schematically a perspective, partially sectional view through the housing 4 from FIG. 3. The container guide 43 divides the interior of the housing 4 into a collecting area 45 and a lower area 47. In the collecting area 45, the containers that enter through the inlet aperture 41 are collected. In the lower area 47, the outlet aperture 42, which discharges into the connecting line 48 of the outlet 2, is disposed. The container guide 43 has an incline from the inlet aperture 41 in the direction of the removal aperture 44. By this means, when containers that fall through the inlet aperture 41 meet the container guide 43, they are guided under their own weight in the direction of the removal aperture 44 due to the effect of gravity. Because the inlet aperture 41 on the upper face 40 is disposed on a first side of the housing 4, and the removal aperture 44 is on a side of the housing 4 that is opposite the first side, a large collecting area can be provided for the containers. Furthermore, the containers are guided away from the area below the inlet aperture 41, so that blocking of the inlet aperture 41 is avoided as long as the collecting area 45 is not completely full.

Fluids that enter through the inlet aperture 41 can reach the lower area 47 through the perforations in the container guide 43. There they meet the floor 46 of the housing 4 due to the effect of gravity. The floor 46 has an incline in the direction of the outlet aperture 42, so that fluids that meet the floor 46 are guided into the outlet aperture 42 due to the effect of gravity. Advantageously, the incline of the container guide 43 and the incline of the housing floor 46 are formed in opposite directions from each other. By this means an effective separation of fluids and containers is achieved.

Furthermore, gases that enter the housing 4 through the inlet aperture 41 can pass through the perforations in the container guide 43 and be extracted by suction through the outlet aperture 42.

The inlet aperture 41 can further be closable by means of an inlet closing device, generally in the form of a slatted ventilation grille (which is not shown). By means of the inlet closing device, while the housing 4 is open via the removal aperture 44 the interior of the housing 4 can be fully or partially closed off from the isolator chamber 10, in order that an exchange of gas between the surroundings and the interior of the isolator chamber 10 can be prevented. It is thereby possible to open the housing 4 without, for example, breaching the sterile environment in the isolator chamber 10.

Alternatively, the housing 4 can also be connected with the isolator chamber 10 of device from FIG. 2 via an airlock, so that, by closing the airlock, a housing 4 which is almost completely full of containers can be exchanged for another container with an empty collecting area, without contaminating the atmosphere within the isolator chamber 10.

To the extent applicable, all individual features described in the example embodiments can be combined with each other and/or exchanged, without departing from the field of the invention.

The invention claimed is:

1. A device for treating containers, comprising:
   an isolator chamber where treatment of the containers takes place;
   an outlet configured to discharge fluids and connected to a floor of the isolator chamber;
   a suction device configured to extract gases from the isolator chamber and connected to the outlet;
   a cleaning-in-place system configured to recycle a cleaning medium, clean the isolator chamber with the cleaning medium and circulate the cleaning medium, wherein the cleaning-in-place system is disposed downstream of the outlet in a direction of flow of the cleaning medium;
   a closer configured to close the containers in the isolator chamber; and
   a filler configured to fill the containers in the isolator chamber;
   wherein:
   the outlet comprises (1) an outlet valve disposed downstream of the connection of the suction device to the outlet in the direction of flow of the cleaning medium (2) a pump disposed downstream of the outlet valve and configured to pump out the cleaning medium and (3) connecting lines extending from below the floor of the isolator chamber towards the outlet valve,
   the outlet valve is configured to close the outlet during intervals between cleanings of the isolator chamber,
   the isolator chamber is divided into a filler chamber to accommodate the filler and a closer chamber to accommodate the closer, and
   wherein the connecting lines comprise a connecting line extending from below a floor of each of the filler chamber and the closer chamber.

2. The device of claim 1, wherein the suction device comprises a suction line.

3. The device of claim 2, further comprising a moisture separator configured to separate moisture at the suction device, wherein the moisture separator is disposed on the outlet.

4. The device of claim 1, wherein the suction device comprises an extraction fan.

5. The device of claim 1, further comprising a preform blowing device configured to stretch blow mold plastic preforms.

6. The device of claim 1, wherein the suction device and the outlet valve are disposed on different lines.

7. A device for treating containers, comprising:
an isolator chamber where treatment of the containers takes place;
an outlet configured to discharge fluids and connected to a floor of the isolator chamber;
a suction device configured to extract gases from the isolator chamber and connected to the outlet;
a cleaning-in-place system configured to recycle a cleaning medium, clean the isolator chamber with the cleaning medium and circulate the cleaning medium, wherein the cleaning-in-place system is disposed downstream of the outlet in a direction of flow of the cleaning medium;
a closer configured to close the containers in the isolator chamber; and
a filler configured to fill the containers in the isolator chamber,
wherein:
the outlet comprises (1) an outlet valve disposed downstream of the connection of the suction device to the outlet in the direction of flow of the cleaning medium, (2) a pump disposed downstream of the outlet valve and configured to pump out the cleaning medium, and (3) connecting lines extending from below the floor of the isolator chamber towards the outlet valve,
by closing the outlet valve, a level of the cleaning medium in the isolator chamber is adjusted,
the outlet valve is configured to close the outlet during intervals between cleanings of the isolator chamber,
the isolator chamber is divided into a filler chamber to accommodate the filler and a closer chamber to accommodate the closer, and
wherein the connecting lines comprise a connecting line extending from below a floor of each of the filler chamber and the closer chamber.

8. The device of claim 7, wherein the outlet comprises a housing configured to receive ejected containers.

9. The device of claim 8, wherein the housing is integrated with the isolator chamber.

10. The device of claim 8, wherein the housing comprises:
an inlet aperture disposed on an upper face of the housing that communicates with the isolator chamber,
an outlet aperture disposed in a lower area of the housing configured to discharge fluid,
a container guide disposed in the housing at least between the inlet aperture and the outlet aperture, and
a removal aperture configured to be opened or closed.

11. The device of claim 10, wherein the container guide comprises a perforated metal plate or a plurality of rods.

12. The device of claim 10, wherein the container guide and/or a floor of the housing is inclined relative to a vertical axis of the housing.

13. The device of claim 10, wherein the inlet aperture comprises an inlet closing device configured to interrupt communication between the housing and the isolator chamber.

14. The device of claim 7, further comprising a preform blowing device configured to stretch blow mold plastic preforms.

15. The device of claim 7, wherein the suction device comprises a suction line.

16. The device of claim 7, further comprising a moisture separator configured to separate moisture at the suction device, wherein the moisture separator is disposed on the outlet.

17. The device of claim 7, wherein the suction device comprises an extraction fan.

18. The device of claim 7, wherein the suction device and the outlet valve are disposed on different lines.

* * * * *